Oct. 10, 1967        A. W. LOHMANN        3,345,912

ROTARY SHEARING INTERFEROMETER

Filed March 10, 1964        2 Sheets—Sheet 1

INVENTOR.
ADOLF W. LOHMANN

BY *Elmer Galbiati*

ATTORNEY

United States Patent Office 3,345,912
Patented Oct. 10, 1967

3,345,912
ROTARY SHEARING INTERFEROMETER
Adolf W. Lohmann, San Jose, Calif., assignor to International Business Machines Corporation, New York, N.Y., a corporation of New York
Filed Mar. 10, 1964, Ser. No. 350,822
6 Claims. (Cl. 88—56)

ABSTRACT OF THE DISCLOSURE

Apparatus is provided for dividing a light beam into two beams and for rotating the two beams relative to each other. The rotated beams are then combined to form an interference pattern. The interference pattern indicates the angular orientation of the wave forms. One application of this novel interferometer is to determine comatic abberation in a lens.

---

The present invention relates to optical systems and, more particularly, shearing interferometers.

Three different types of shearing interferometers are presently known. The first type interacts two wavefronts which have differential lateral positions; that is the two wavefronts are shifted in a direction perpendicular to the optical axis. The second type interacts two wavefronts which have different longitudinal positions; that is, the two wavefronts are shifted in a direction parallel to the optical axis and the third type interacts two wavefronts which have different magnifications. The third type of interferometer is generally termed a radial interferometer. The presently known types of interferometers have many uses; however, they do not display in a readily-identifiable or measurable manner certain characteristics of images. The present invention provides an interferometer which produces an interference pattern between two identical images which have different angular orientations. The interference pattern generated by the present invention displays in a measurable manner certain characteristics of images not easily measured with prior types of interferometers. For example, it allows one to easily detect the comatic aberration in a lens.

One of the applications of the present invention is in lens testing apparatus. The first three orders of aberration in a lens are respectively termed spherical aberration, comatic aberration and astigmatic aberration. There are commercially available devices for measuring the sum of the spherical aberration, the comatic aberration and the astigmatic aberration. With such devices it is very difficult to detect or measure the comatic aberration of the lens due to the large effects produced by any slight spherical or astigmatic aberration in the lens. The present invention provides a device which displays the comatic aberration in a lens in a measurable manner irrespective of whether the lens also has spherical or astigmatic aberrations.

An object of the present invention is to provide an improved interferometer.

Another object of the present invention is to provide an interferometer which generates an interference pattern using two images which have different angular orientations.

A still further object of the present invention is to provide an improved lens testing apparatus.

Another object of the present invention is to provide a device for measuring comatic aberration in a lens system.

Another object of the present invention is to provide a device which displays the comatic aberration of a lens system without simultaneously either displaying the spherical aberration or the astigmatic aberration in the lens system.

The lens testing apparatus of the present invention includes means for generating two identical images by a lens, the two images having angular orientations which are separated by 180 degrees, and means for combining these two images to produce an interference pattern thereby displaying any comatic aberration in the lens.

The foregoing and other objects, features and advantages of the invention will be apparent from the following more particular description of preferred embodiments of the invention, as illustrated in the accompanying drawings.

Figure 1:
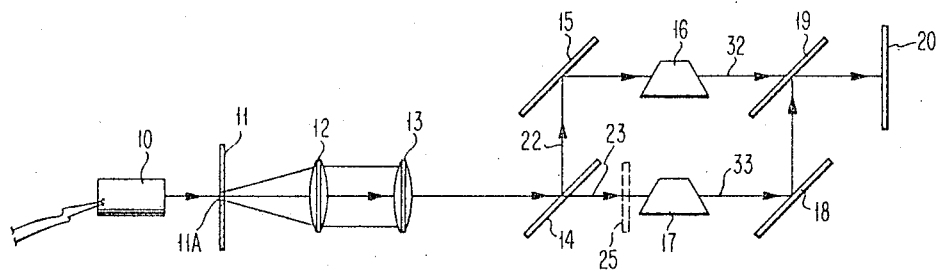
FIGURE 1 is a diagrammatic representation of a first preferred embodiment of the present invention.

The first preferred embodiment of the invention shown in FIGURE 1 is a lens testing apparatus. It includes a monochromatic light source 10, a mask 11 which has a small aperture 11A, a collimating lens 12, a lens under test 13, a beam splitter 14, three mirrors 15, 18 and 19, two beam rotating devices 16 and 17, and a screen 20.

Light source 10 generates a beam of light which is collimated and passed through the lens under test 13. Beam splitter 14 divides the light which passes through lens 13 into two beams 22 and 23. Beams 22 and 23 are respectively passed through rotating devices 16 and 17 and then the beams are combined and an image is formed on screen 20. The angular orientation of devices 14, 15, 18 and 19 is arranged so that the light in both beams which passed through the center of lens 13 falls at the same position on screen 20. Rotating device 16 rotates beam 22 by 90 degrees in a clockwise direction and rotating device 17 rotates beam 23 in a counter clockwise direction. Devices for rotating a beam are generally multiple prisms which produce multiple internal reflection. Such devices are well known and one of the better known is commonly termed a dove prism.

The aberration of a wavefront may be expressed mathematically as:

$$W(r, b) = W_s(r) + W_c(r) \cos b + W_a(r) \cos (2b) + \ldots$$

where:

$r$ represents the radius of a point
  $b$ represents the angle of a point
  $W(r, b)$ indicates the aberration or separation between two wavefronts expressed in polar coordinates
  $W_s(r)$ is the spherical aberration
  $W_c(r) \cos b$ is the comatic aberration
  $W_a(r) \cos (2b)$ is the astigmatic aberration Due to the action of rotating devices 16 and 17 the two images which are superimposed on screen 20 have been rotated by 180 degrees relative to each other. As indicated above, spherical aberration is only a function of the radius of the wavefront; hence, rotating a wavefront has no effect on the spherical aberration. The spherical aberration of the two superimposed wavefronts is therefore identical and it will not produce any interference effects at screen 20. Since the astigmatic aberration is a function of cos $(2b)$ it is periodic over 180 degrees around the wavefront. The images which are projected on a screen 20 are rotated by 180 degrees relative to each other. Hence, the astigmatic aberrations of the two images are in phase and they do not produce any interference effects.

Figures 2, 3:
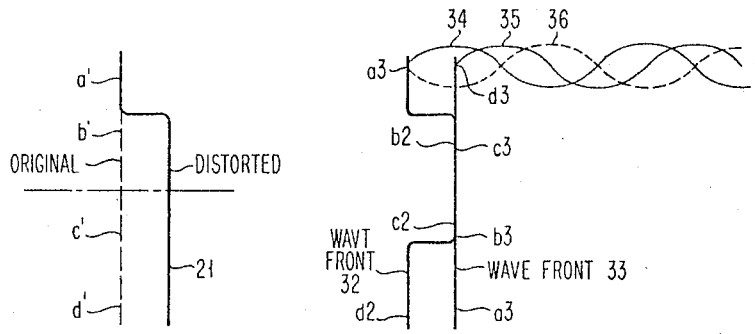
FIGURES 2 and 3 are side views of wavefronts which have comatic aberration.

The effects produced by any comatic aberration in lens 13 will now be discussed. For purposes of illustration, it is assumed that lens 13 has a relatively large amount of comatic aberration and that it produces distortion such as that shown in FIGURE 2. FIGURE 2 shows that before a wavefront enters lens 13, it is a plane wave, but that after passing through lens 13 the wave is distorted as shown by line 21. The distortion is comatic; that is, it is periodic on a 360 degree basis around the lens. For purposes of subsequent discussion, four points on lens 13, designated $a'$, $b'$, $c'$ and $d'$, will be described. All of the points $a'$, $b'$, $c'$ and $d'$ are located on one diagonal line. Points $b'$ and $c'$ are equidistant from the center of the lens, and likewise points $a'$ and $d'$ are equidistant from the center of the lens.

As previously explained, the system shown in FIGURE 1 divides the light passing through the lens into two beams which are rotated 180 degrees relative to each other. FIGURE 3 shows a cross section of the wavefronts on paths 22 and 23 after the wavefronts have passed through rotating devices 16 and 17. The wavefront at the designated position (see FIGURE 1) on path 23 is designated 33 and the wavefront at the designated position on path 22 is designated 32. Each of the wavefronts have points corresponding to points $a''$, $b'$, $c'$ and $d'$ on the lens. The corresponding points on wavefront 32 are designated $a2$, $b2$, $c2$ and $d2$, and the corresponding points of the wavefront at position 33 are designated $a3$, $b3$, $c3$ and $d3$. For example, point $a2$ in wavefront 32 passed through point $a'$ on lens 13. Since the wavefronts traveling along paths 22 and 23 are rotated by 180 degrees relative to each other, at screen 20 point $a2$ of wavefront 32 is imaged at the same position as point $d3$ of wavefront 33. The position on the screen 20 where points $b2$ and $c3$ is imaged is designated $b2$–$c3$, the position where points $d2$ and $a3$ is imaged is designated $d2$–$a3$, etc. Due to the distortion created by the lens, there is a phase difference between the two wavefronts at positions $a2$–$d3$ and at positions $d2$–$a3$; however, there is no phase difference between the wavefronts at positions $b2$–$c3$ and $c2$–$b3$. The phase difference at position $a2$–$d3$ is shown in FIGURE 3 by lines 34 and 35.

At points $b2$–$c3$ and $c2$–$b3$ the screen is illuminated with the full intensity of the light source; however, at points $a2$–$d3$ and $d2$–$a3$ interference effects due to the phase difference in the two wavefronts diminish the intensity of the illumination on screen 20. The decrease in the illumination of the screen indicates that lens 13 has comatic aberration.

It is well known that it is relatively difficult to detect a small decrease in illumination from a relatively large amount of illumination. However, it is relatively easy to detect a small increase in illumination from a relatively small amount of illumination. For example, if screen 20 is generally illuminated to an intensity of nine units, a portion of the screen that is only illuminated to an intensity of eight units is relatively difficult to detect. However, if the major portion of screen 20 is generally only illuminated to an intensity of one unit, a portion which has an intensity of two units is easy to detect.

If a lens has a large amount of comatic aberration so that the wavefronts from paths 22 and 23 are separated by a large phase angle, the amount of illumination at screen 20 is zero in some areas and in other areas it is relatively large. Such variations in illumination are easy to detect. However, if the lens under test has only a small amount of comatic aberration, most of the area of screen 20 is illuminated to a uniform intensity and only certain discrete areas have a slight decrease in illumination due to the small amount of comatic aberration. This is difficult to detect.

The ability to detect small amounts of comatic aberration can be increased by inserting in one of the paths 22 or 23 a device for retarding the wavefront by 180 degrees. This is shown in FIGURE 1 as device 25. Device 25 merely need consist of a plate of transparent material which has a thickness which is related to the wave length of the light source so that the wavefronts passing through are retarded by 180 degrees.

Retarding a wavefront by 180 degrees has the effect of inverting the phase of the wavefront. This is shown by the dotted line 36 in FIGURE 3. With device 25 in place, if lens 13 produces no comatic aberration, screen 20 is completely dark since the wavefronts traveling along path 23 are exactly 180 degrees out of phase with the wavefronts from path 22. Hence, they exactly cancel each other. However, where lens 13 does produce comatic aberration, the wavefronts do not exactly cancel each other and, hence, some light appears on screen 20. Naturally, if the lens 13 has a large amount of comatic aberrations and device 25 is used, screen 20 is almost entirely illuminated and, hence, it is difficult to detect areas which have comatic aberration.

In conclusion, in order to detect large amounts of comatic aberration, device 25 should not be in the system; however, in order to detect small amounts of comatic aberration device 25 should be included in the system.

Figure 4:
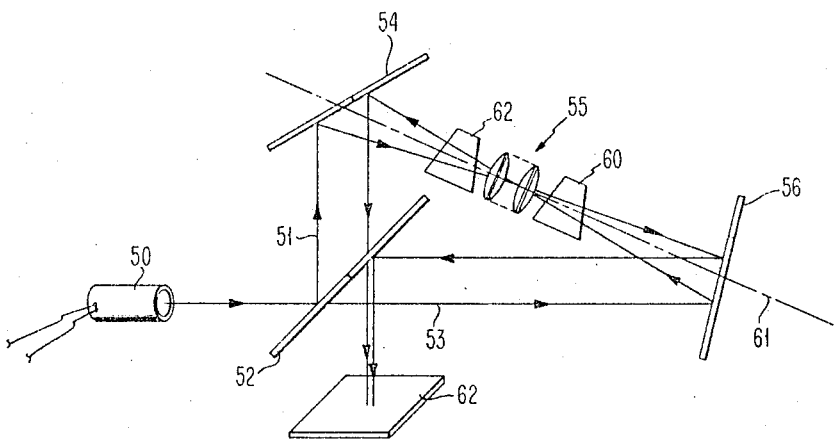
FIGURE 4 is a schematic diagram of a second preferred embodiment of the present invention.

A second preferred embodiment of the present invention is shown in FIGURE 4. FIGURE 4 shows a light source 50, a beam splitter 52, mirrors 54 and 56, dove prisms 60 and 62, screen 56 and a lens system 55 which is being tested. The light from source 50 is divided into two beams by beam splitter 52. The two beams are respectively designated 51 and 53 and they are directed along the optical axis 61 by mirrors 54 and 56. The two beams travel along optical axis of lens system 55 in opposite directions. Beam splitter 52 and mirrors 54 and 56 are oriented so that the two beams travel along substantially the same axis in lens system 55 and so that the beams are concentrically focused on screen 62. Dove prisms 60 and 62 which are positioned along optical axis 61 each rotate images passing therethrough by 90 degrees. The direction of rotation is dependent upon the direction that the light is traveling; hence, beams 51 and 53 are rotated in opposite directions by each of the dove prisms so that relative to each other the two images generated by lens system 55 are rotated by 180 degrees. Each beam passes through one of the prisms before it reaches the lens system 55. Before reaching lens system 55, the wavefront of each beam is a plane wave, hence the rotation of each beam prior to passing through lens system 55 is of no significant effect. Thus, the second embodiment, like the first embodiment, produces two coherent images of the aberrations in the lens, the two images being rotated by 180 degrees relative to each other.

For the same reasons as explained with respect to the first embodiment the interference produced by the two images which are generated on screen 62 indicates any comatic aberration present in the lens system 55.

The phase reversal obtained with element 25 in the first embodiment can be obtained in the second embodiment by use of a wedge of material in front of one of the mirrors. Due to the separation of the beams, one of the beams would go through a larger portion of the wedge and its position could easily be arranged in order to give the correct phase reversal.

Figure 5:
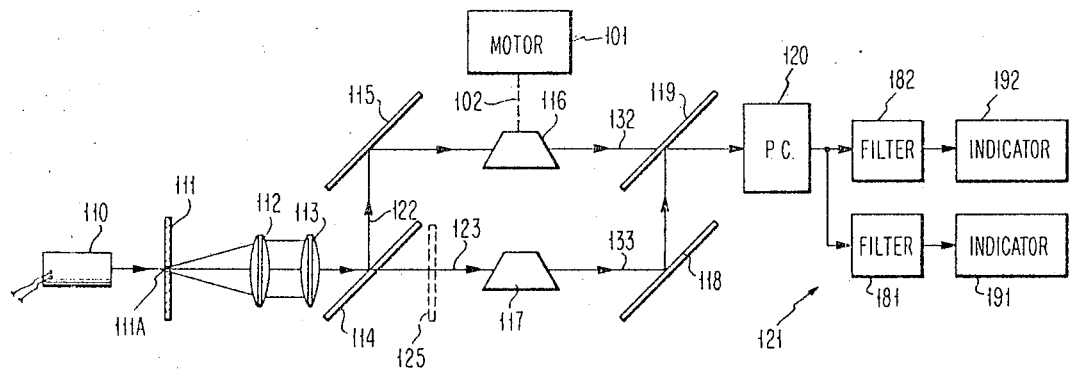
FIGURE 5 shows a third preferred embodiment of the present invention.

A third preferred embodiment of the present invention is shown in FIGURE 5. The third embodiment is identical to the first embodiment with the exception that screen 20 has been replaced by electrical circuitry 121 and a motor 101 is mechanically connected (indicated by dotted line 102) to dove prism 116 so that prism 116 can be rotated. Circuitry 121 includes a photoreceptor 120, two band pass filters 181 and 182 and two indicators 191 and 192. In order to show the correspondence between the first embodiment and the third embodiment the various components in the third embodiment are designated by a three-digit numeral. The last two digits of each three-digit numeral correspond to the digits used to identify corresponding elements in the first embodiment.

The third embodiment generates an interference pattern on the face of photocell 120. The particular interference pattern which is generated depends upon the orientation of dove prism 116. It is well known that as a dove prism is rotated it changes the amount of rotation effected upon images passing through the prism. Dove prism 116 is constantly rotated by motor 101 so that the pattern on the face of photocell 120 is constantly changing.

The constant rotation of prism 116 results in a cyclic variation in the relative rotation between the two wavefronts.

As previously explained, comatic aberration is a function of $b$ and astigmatic aberration is a function of $2b$, where $b$ represents the angular orientation of a point on the lens. Stated differently, the comatic aberration is periodic with respect to one complete revolution of an image formed by a lens and astigmatic aberration is periodic with respect to a 180 degree rotation of an image formed by a lens. Thus, when dove prism 116 is rotated at a particular angular frequency of $y$ the fluctuations in the pattern on the face of photocell 120 due to comatic aberration will vary with a frequency equal to $y$; whereas, the fluctuations in the pattern due to astigmatic aberration will vary as a function of $2y$.

Filter 181 is a band pass filter, which has a pass band centered about the frequency $y$ and filter 182 is a band pass filter, which has a pass band centered about the frequency of $2y$. Thus, the output of filter 181 gives an indication of the comatic aberration in the lens and the output of filter 182 gives an indication of the astigmatic aberration in the lens. Indicators 191 and 192 indicate the magnitude of the output of the associated filters.

Figure 6:
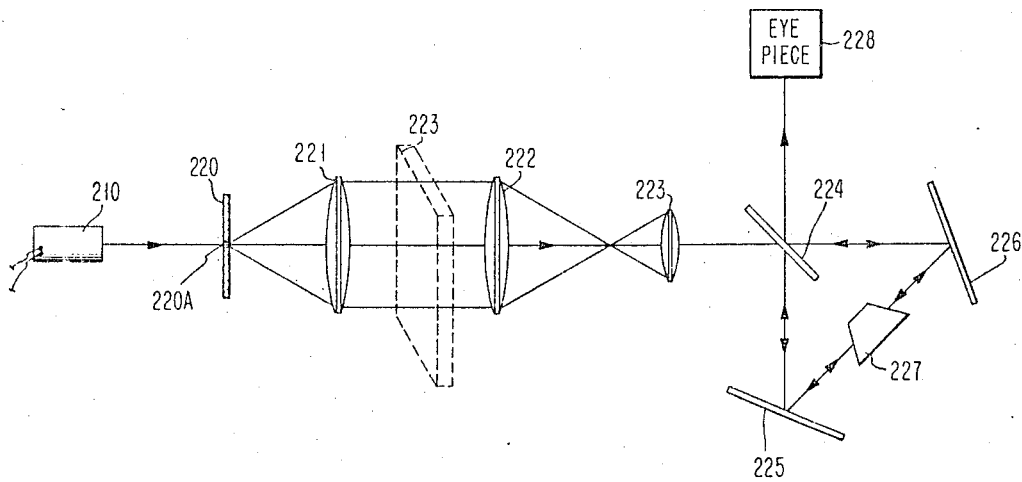
FIGURE 6 shows a fourth preferred embodiment of the present invention.

FIGURE 6 shows a fourth alternate preferred embodiment. The function of the fourth embodiment is to examine the phase characteristics of object 223 which may, for example, be merely the motion of air in a wind tunnel. The device shown determines what effect the object 223 has on a wavefront which passes through it. The fourth embodiment includes a light source 210, a mask 220 which has a small aperture 220A therein, a collimating lens 221, a condensing lens 222, an objective lens 223, a beam splitter 224, mirrors 225 and 226, dove prism 227 and eye piece 228. The image generated in object 223 is sent along two different paths by beam splitter 224 so that the image travels through dove prism 227 in two different directions. The dove prism rotates the two images in opposite directions and produces an interference pattern which can be viewed by means of eye piece 228. The amount of relative rotation between the two images can be adjusted by positioning dove prism 227. As shown in FIGURE 6, beam splitter 224 and mirrors 225 and 226 are positioned so that the two images travel along exactly the same axis in opposite directions. Alternately, beam splitter 224 and mirrors 225 and 226 could be oriented so that the two images travel along different paths which merely coincide at dove prism 227. This would be similar to the paths shown in FIGURE 4.

The interference pattern visible by means of eye piece 228 shows certain characteristics of object 223. For example, if more interference takes place when dove prism 227 is oriented so that it rotates each image by 90 degrees than when dove prism 227 is oriented so that it rotates each image by 180 degrees, it indicates that the variations in object 223 are more nearly periodic over 180 degrees than over 360 degrees.

The embodiments of the invention described herein relate to transmission type of phase objects. The present invention could also be used to test reflective type of phase objects such as to test the surface of spherical or flat mirrors. In such applications the wavefronts would be generated by reflecting a wave from the surface rather than by transmitting a wave through the object as is done in the embodiments of the invention shown herein. Optics for generating the required wavefronts by reflection are well known.

While the invention has been particularly shown and described with reference to preferred embodiments thereof, it will be understood by those skilled in the art that the foregoing and other changes in the form and details may be made therein without departing from the spirit and scope of the invention.

What is claimed is:
1. A device for detecting comatic aberration in a lens:
   means for passing two coherent optical wavefronts through said lens;
   means for rotating said wavefronts by substantially 180 degrees relative to each other; and
   means cooperating with said lens for focussing and interacting said wavefronts thereby forming an interference pattern,
   whereby the comatic aberration of said lens can be detected.
2. A device for detecting comatic aberration in a lens:
   means for forming two coherent optical wavefronts;
   means for passing said wavefront through a lens thereby forming an image of any aberration in said lens;
   means for rotating said images by substantially 180 degrees relative to each other; and
   means cooperating with said lens for focusing and interacting said images on the same plane,
   whereby an interference pattern is generated which indicates any comatic aberration in said lens.
3. A lens testing device, comprising:
   means for passing an optical wavefront through said lens;
   means for dividing said wavefront into two coherent wavefronts after said wavefront has passed through said lens;
   means for rotating said two wavefronts by substantially 180 degrees relative to each other; and
   means cooperating with said lens for concentrically focusing and interacting said two wavefronts on a plane,
   whereby an interference pattern is generated which indicates any comatic aberration in said lens.
4. A lens testing device, comprising:
   means for passing a wavefront through said lens;
   means for dividing said wavefront into two coherent wavefronts after said wavefront has passed through said lens;
   a dove prism positioned in the path of said each of said wavefronts, said dove prisms oriented so that they rotate the images passing through by 90 degrees in opposite directions whereby said two wavefronts are rotated by 180 degrees relative to each other; and
   means cooperating with said lens for concentrically focusing and interacting said two wavefronts on a plane,
   whereby an interference pattern is generated which indicates any comatic aberration in said lens.
5. A device for testing the phase characteristics of a wavefront originating at an object comprising:
   dividing means, means for directing said wavefront from said object to said dividing means,
   said dividing means dividing said wavefront into two wavefronts;
   means for rotating said wavefront relative to each other; and
   means cooperating with said object for focusing and combining said wavefronts to generate an interference pattern,
   whereby the phase characteristics of said wavefront are indicated by the shape of said interference pattern.
6. A lens testing device, comprising:
   means for passing a wavefront through said lens;
   beam splitting means for dividing said wavefront into two wavefronts;

means for cyclically rotating said wavefronts relative to each other,
a photodetector;
means cooperating with said lens for focusing and interacting said two wavefronts on said photodetector; and
a plurality of filters connected to the output of said photodetector, each of said filters having a different pass band,
whereby the output of each filter represents the amount of a particular type of aberration in said lens.

References Cited

Gates, The Measurement of Comatic Aberrations by Interferometry, in Physical Society of London Proceedings, 68B (12): pp. 1065–1072, December 1955.

Saunders, Inverting Interferometer, in Journal of the Optical Society of America, 45(2): p. 133, February 1955.

JEWELL H. PEDERSEN, *Primary Examiner.*

JOHN K. CORBIN, *Examiner.*